United States Patent
Liu (10) Patent No.: US 7,852,773 B2
(45) Date of Patent: Dec. 14, 2010

(54) NETWORK MANAGEMENT METHOD APPLIED TO A USER APPARATUS USING IEEE 802.3AH

(75) Inventor: Chuan-Wei Liu, Hsinchu County (TW)

(73) Assignee: Accton Technology Corporation, Hsinchu (TW)

( * ) Notice: Subject to any disclaimer, the term of this patent is extended or adjusted under 35 U.S.C. 154(b) by 263 days.

(21) Appl. No.: 11/907,938

(22) Filed: Oct. 18, 2007

(65) Prior Publication Data

US 2008/0253291 A1 Oct. 16, 2008

(30) Foreign Application Priority Data

Apr. 16, 2007 (TW) .............................. 96113399 A (51) Int. Cl.
*H04J 1/16* (2006.01)
*H04J 3/16* (2006.01)
*H04J 3/24* (2006.01)
*G06F 15/173* (2006.01)

(52) U.S. Cl. ...................... 370/241; 370/466; 370/474; 709/224

(58) Field of Classification Search ...................... None
See application file for complete search history.

(56) References Cited

U.S. PATENT DOCUMENTS

| 6,216,171 B1 * | 4/2001 | Isono et al. ................. 709/250 |
| 6,374,288 B1 * | 4/2002 | Bhagavath et al. .......... 709/203 |
| 6,426,947 B1 * | 7/2002 | Banker et al. ............... 370/254 |
| 2004/0165595 A1 * | 8/2004 | Holmgren et al. ........ 370/395.3 |
| 2005/0099952 A1 * | 5/2005 | Mohan et al. ............... 370/241 |
| 2008/0253769 A1 * | 10/2008 | Liu ............................. 398/58 |

* cited by examiner

*Primary Examiner*—Nittaya Juntima
(74) *Attorney, Agent, or Firm*—Birch, Stewart, Kolasch & Birch, LLP (57) ABSTRACT

A network management method is applied to a network management system, which includes at least one user apparatus and a network managing agent apparatus connected to the user apparatus. The management method includes the steps of: adopting at least one information string, which is set by a network management protocol established for at least one layer except a data-link layer, by the network managing agent apparatus; packing the information string into a managing packet; and transmitting the managing packet to the user apparatus through the data-link layer according to an Ethernet protocol by the network managing agent apparatus.

9 Claims, 7 Drawing Sheets

NETWORK MANAGEMENT METHOD APPLIED TO A USER APPARATUS USING IEEE 802.3AH

CROSS REFERENCE TO RELATED APPLICATIONS

This Non-provisional application claims priority under 35 U.S.C. §119(a) on Patent Application No(s). 096113399 filed in Taiwan, Republic of China on Apr. 16, 2007, the entire contents of which are hereby incorporated by reference.

BACKGROUND OF THE INVENTION

1. Field of Invention

The invention relates to a network management method and, in particular, to a network management method applied to a user apparatus.

2. Related Art

The network has become an important tool in the daily life of human beings, so that people can transmit data to and share the data with one another through the network. In addition, with the progress of the technology, the network transmission method has been developed from the conventional dial-up network to the present broadband network so that the network speed and the data transmission quantity are greatly increased.

The hierarchical architecture of network transmission may be found from some public network reference models, such as the open system interconnection (OSI) reference model and the Darpa reference model. The OSI reference model is established by the international standard organization (ISO) and comprises seven layers. The seven layers comprise a physical layer, a data-link layer, a network layer, a transport layer, a session layer, a presentation layer and an application layer. The Darpa reference model comprises four layers including a physical layer, a data-link layer, a network/transport layer and an application layer. The physical layer and data-link layer of the Darpa reference model respectively correspond to the physical layer and the data-link layer of the OSI reference model. The network/transport layer of the Darpa reference model corresponds to the network layer and the transport layer of the OSI reference model. The application layer of the Darpa reference model corresponds to the session layer, the presentation layer and the application layer of the OSI reference model.

The layers are in charge of different functions and tasks. For example, data packet (frame) formats with different network patterns are established for the data-link layer to ensure the data packet to be transmitted in different network entities, such as a coaxial cable, a double-twisted line, an optical fiber and a phone data line. In addition, the data packet is transmitted with a media access control address (MAC Address) in this layer. Also, various protocols, such as file read, copy, open and close protocols, associated with programs are defined in the application layer.

In addition, some protocols are established for these layers respectively so that the data may be transmitted according to these transmission protocols. For example, regarding to the application layer, a hypertext transfer protocol (HTTP) can be established for webpage transfer, a file transfer protocol (FTP) can be established for file transfer, and a simple network management protocol (SNMP) can be established for the network apparatus management. In addition, the new protocol may be established according to the requirement. For example, the IEEE 802.3ah protocol established according to the Ethernet in the first mile alliance (EFMA) is applied to the data-link layer, and the Ethernet may be directly applied to the user apparatus according to this protocol.

The typical network transmission architecture is formed by connecting the fundamental hardware architectures of the wired phones in series. The fundamental hardware architectures are mostly built by the type I telecommunication company (e.g., Chunghwa Telecom Co., Ltd. in Taiwan), while the type II telecommunication company (e.g., Seednet or So-net in Taiwan) provides a value-added service, such as an asymmetric digital subscriber loop (ADSL) service under the fundamental construction provided by the type I telecommunication company. The type II telecommunication company is the so-called Internet service provider (ISP).

Figure 1:
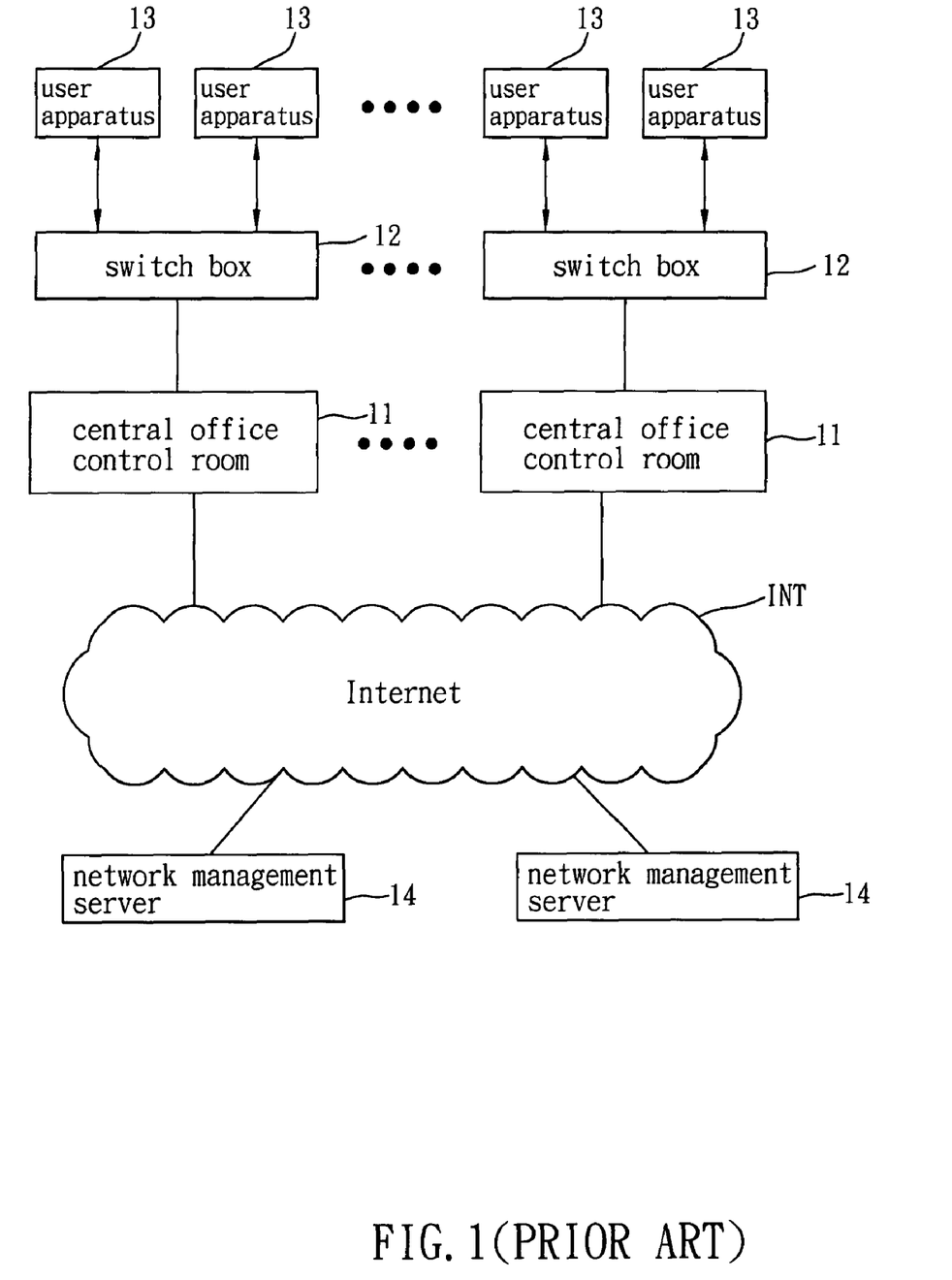
FIG. 1 is a schematic illustration showing a conventional network transmission architecture.

FIG. 1 shows the typical network transmission architecture. The type I telecommunication company sets up many central office control rooms 11, each of which has one end connected to the Internet INT and the other end connected to a user apparatus 13 through a switch box 12. The path from the user apparatus 13 to the central office control room 11 is referred to an access network, and the user apparatus 13 is again connected to a core network (e.g. the Internet INT) through the central office control room 11. In addition, a network management server 14 of an ISP is connected to the other end of the Internet INT, and monitors, manages or updates the programs for the network apparatus (e.g., modem) of the user apparatus 13 through the Internet INT.

When the network management server 14 wants to perform the network management on one of the user apparatuses 13, the network management server 14 transmits an Internet protocol (IP) packet, and the IP packet comprises instructions or data such as the simple management protocol or other network management protocols. The IP packet is transferred in the Internet INT according to the Internet protocol, and transmitted to the central office control room 11. Then, the data in the managing packet is transmitted to the user apparatus 13 to perform the network management through the access technology corresponding to ADSL or a cable modem, for example.

However, when the network management server 14 wants to perform the network management on the user apparatus 13, it has to transmit the IP packet through the Internet INT, the central office control room 11 and the switch box 12 and then to manage the network apparatus of the user apparatus 13. In general, the network management server 14 manages the network apparatuses of the user apparatuses 13, thereby greatly increasing the data transmission quantity of the network. However, the bandwidth between the Internet INT and the central office control room 11 is fixed, so the usage efficiency of the bandwidth is lowered. In addition, since the network management server 14 has to perform the network management on all the user apparatuses 13, a database for storing status data of the network apparatus of each user apparatus 13 has to be created. Consequently, it brings the heavy loading to the network management server 14 and decreases the processing efficiency of the network management server 14.

In addition, the access of a network has been upgraded from the dial-up connection to the broadband connection through the broadband access technology (e.g., ISDN, ADSL or the cable modem) in the current network architecture. However, the bandwidth of the access of a network still becomes the bottleneck of the overall network bandwidth. In addition, the price of the broadband service provided by the access of a network is always the great loading to the user. Also, in order to provide various access technologies for the user apparatuses from the point of view of the ISP, the ISP has to provide different system apparatuses and spend a lot of money in maintaining the system apparatuses. Consequently, if the well-known Ethernet in the central office control room 11 is directly connected to home, the packet of the Ethernet may be directly transmitted to the computer of the user apparatus. Thus, the redundant access apparatuses may be omitted, and the bandwidth may also be greatly increased. Recently, the EFM technology is developed in response to such requirements. Consequently, if the access network can be combined with the Ethernet, the transmission speed and efficiency can be greatly increased, and the cost may be decreased.

Thus, it is an important subject to provide a network management method capable of decreasing the network management workload of the network management server on the user apparatus, increasing the efficiency of the network management server and the usage efficiency of the bandwidth, and greatly increasing the network transmission speed and the overall network management effect in conjunction with the Ethernet.

SUMMARY OF THE INVENTION

In view of the foregoing, the invention is to provide a network management method capable of decreasing the network management workload of the network management server on the user apparatus, increasing the efficiency of the network management server and the usage efficiency of the bandwidth, and greatly increasing the network transmission speed and the overall network management effect in conjunction with the Ethernet.

To achieve the above, the invention discloses a network management method applied to a network management system. The network management system includes at least one user apparatus and a network managing agent apparatus connected to the user apparatus. The management method includes the steps of: adopting at least one information string, set by a network management protocol adopted by one of the layers except the data-link layer, by the network managing agent apparatus; packing the information string into a managing packet; and transmitting the managing packet to the user apparatus through the data-link layer according to an Ethernet protocol by the network managing agent apparatus.

As mentioned above, in the network management method according to the invention, a network managing agent apparatus serves as the network management apparatus, such as the network management server of the ISP, and the network management agent of the user apparatus. The Ethernet is established between the network managing agent apparatus and the user apparatus. Then, the network apparatus (e.g., modem) of the user apparatus is managed according to the instruction or data set by the network management protocol (e.g., SNMP and TR-069) adopted by one of the layers except the data-link layer. Compared with the prior art, the invention distributes the loading of the network management apparatus for all the user apparatuses over the network managing agent apparatuses, and build up the distributed management architecture so that the workload of the network management apparatus is decreased, and the processing efficiency of the network management apparatus is enhanced. In addition, each network managing agent apparatus directly transmits the managing packet to the user apparatus without through the Internet, so the usage efficiency of the bandwidth is increased. Furthermore, since the Ethernet is adopted between the network managing agent apparatuses and the user apparatus, the network transmission speed and the network managing efficiency may be greatly increased.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
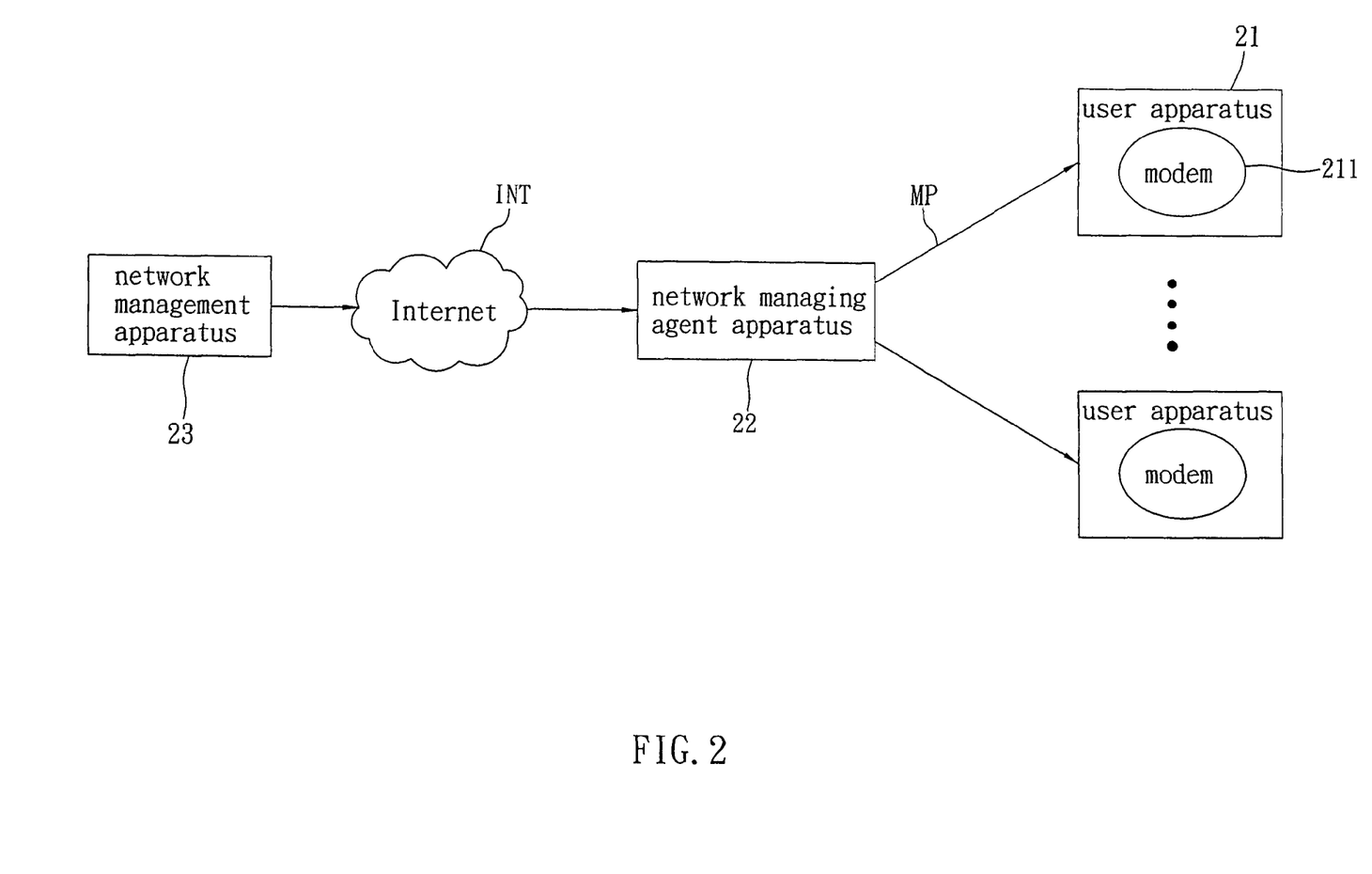
FIG. 2 is a schematic illustration showing a network management system according to a preferred embodiment of the invention.

Referring to FIG. 2, a network management system 2 according to the preferred embodiment of the invention includes at least one user apparatus 21, a network managing agent apparatus 22 and a network management apparatus 23. The user apparatus 21 includes a network apparatus, such as a modem 211, and is connected to the network managing agent apparatus 22 through the modem 211. In addition, the network managing agent apparatus 22 is connected to one end of the Internet INT, and the network management apparatus 23 is connected to the other end of the Internet INT.

In this embodiment, the user apparatus 21 may be a personal computer, a personal digital assistant (PDA) or any other terminal apparatus. The modem 211 serves as a data converting medium between the user apparatus 21 and the network managing agent apparatus 22 so that data transmission may be performed between them. In addition, the network management apparatus 23 may be a network management server for performing the network management on the modem 211 of the user apparatus 21 through the Internet INT. The network management server may be provided by an Internet service provider (ISP), for example.

Figure 3:
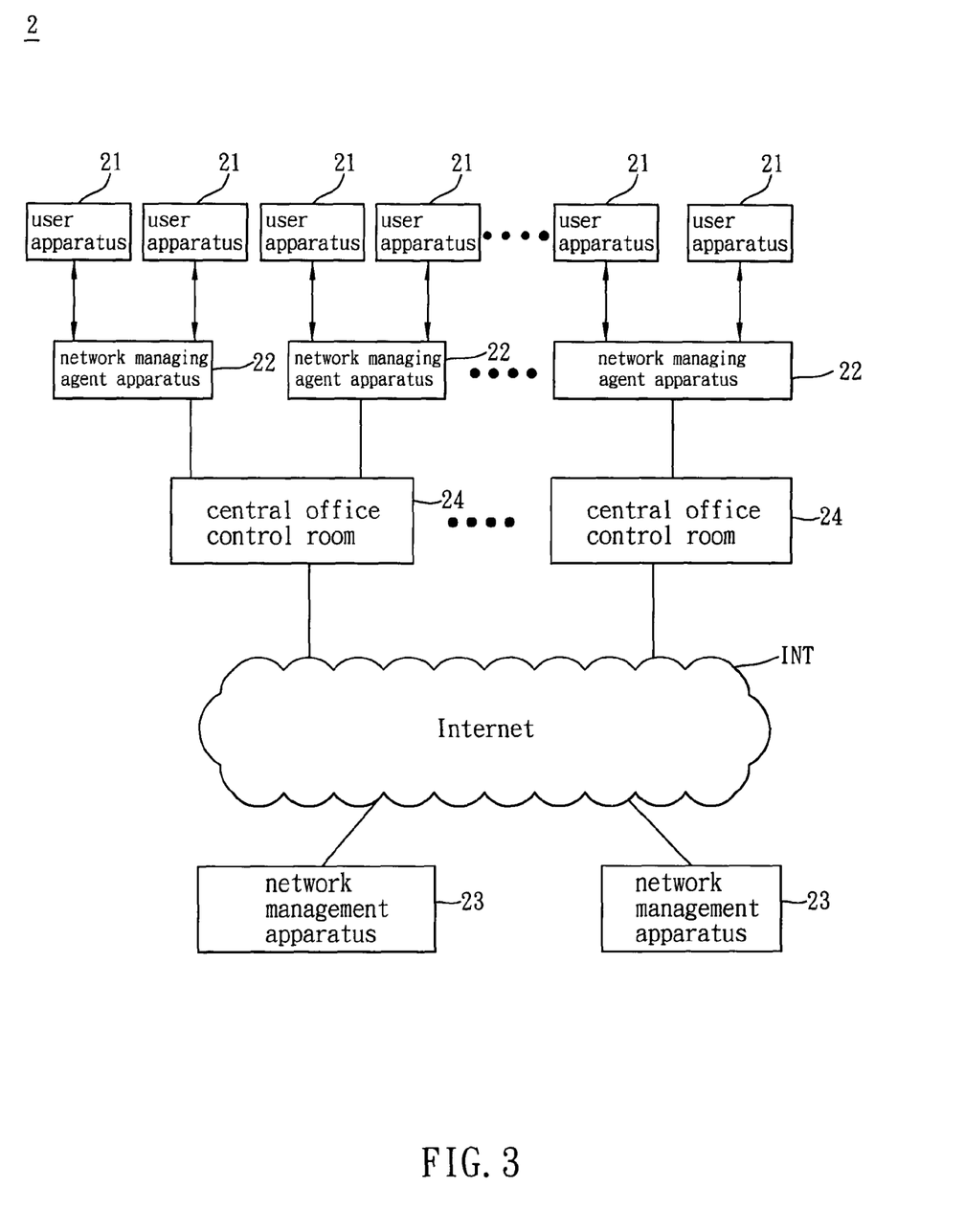
FIG. 3 is a schematic illustration showing a network management system applied to the larger network architecture according to the preferred embodiment of the invention.

In addition, if this embodiment is applied to the larger network architecture, as shown in FIG. 3, the network management system 2 includes a plurality of network managing agent apparatuses 22, and a plurality of central office control rooms 24 set up between the network managing agent apparatuses 22 and the Internet INT. The adjacent network managing agent apparatuses 22 are connected first to one of the central office control rooms 24 and are then connected to the Internet INT through the central office control room 24. Consequently, it is possible to prevent the signal attenuation caused by the too-long distance between the network management apparatus 23 and the network managing agent apparatus 22 so that the overall management efficiency is enhanced.

As shown in FIG. 2, data is transmitted between the network managing agent apparatus 22 and the user apparatus 21 through the Ethernet in this embodiment. Since the Ethernet has become an authorized standard of the Internet INT, the access of a network from the network managing agent apparatus 22 to the user apparatus 21 may be regarded as the extension of the Internet INT in this embodiment. Thus, the access apparatus provided by the Internet service provider for the purpose of supporting various access technologies may be omitted from the access network.

In this embodiment, the network managing agent apparatus 22 transmits a managing packet (MP) to the user apparatus 21 according to an Ethernet protocol to manage the modem 211 of the user apparatus 21 to solve the problems of the modem 211, to configure the configuration or to update the programs. As the well-known in the art, the Ethernet protocol is defined in the first layer and the second layer (i.e., the physical layer and the data-link layer) in the OSI reference model, and the managing packet (MP) is transmitted to the modem 211 of the user apparatus 21 through a media access control address (Mac address) in the data-link layer.

In this embodiment, the network managing agent apparatus 22 uses the Ethernet protocol of IEEE 802.3ah, which is recently constituted and promoted by the IEEE 802.3ah working group and the Ethernet in the first mile alliance (EFMA). The Ethernet can be applied to the client according to this protocol so that the bandwidth and the transmission speed of the access of a network can be increased, and the cost of the network system can be reduced. In addition, the transmission medium may be a conventional twist-pair copper or an optical fiber under the IEEE 802.3ah protocol.

The IEEE 802.3ah protocol also defines the operation, administration and maintenance (OAM) functions of the Ethernet, and the packet with these functions is defined as an OAMPDU (OAM Protocol Data Unit) packet, which may be expanded, extended and self-defined. In this embodiment, the managing packet (MP) transmitted by the network managing agent apparatus 22 is the OAMPDU packet.

Figure 4:
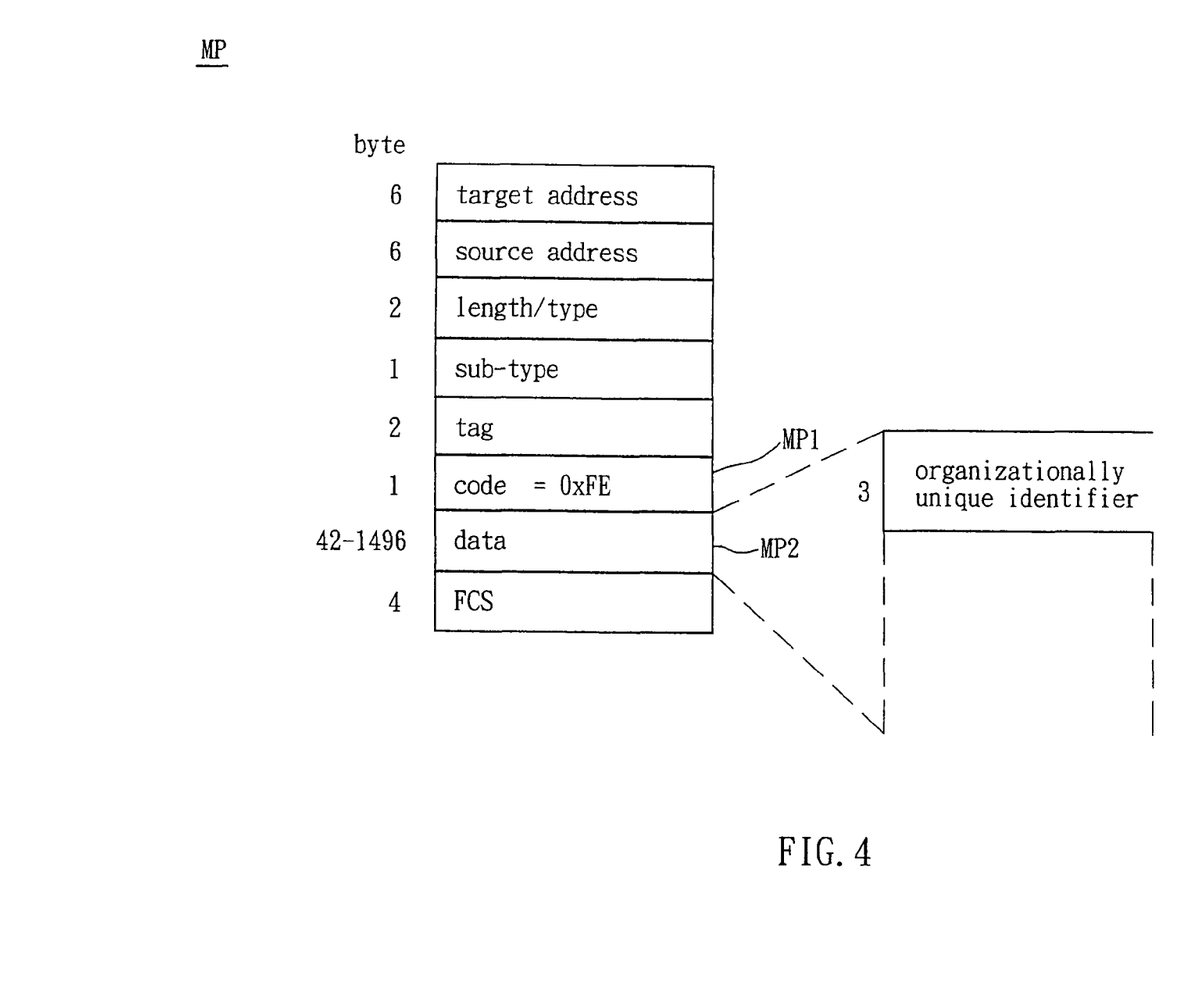
FIG. 4 is a schematic illustration showing a specially organized OAMPDU packet transmitted by the network management system according to the preferred embodiment of the invention.

As shown in FIG. 4, the OAMPDU packet has many fields including a target address, a source address and the like. When the value of the code field MP1 is set as the hexadecimal value of "0xFE", it represents that the packet is an organization specified as an OAMPDU packet, which is a packet having a format extended and self-defined by an organization. In addition, the data field MP2 of the organization specified as an OAMPDU packet includes an organizationally unique identifier (OUI) with three bytes. The OUI is provided for the purpose of authentication of the organization, and the format and function of the data field MP2 are set according to this organizationally unique identifier.

In this embodiment, the network managing agent apparatus 22 performs the network management on the modem 211 of the user apparatus 21 according to the network management protocol adopted in one of the layers except the data-link layer. As for the OSI reference model, the layers except the data-link layer include the physical layer, the network layer, the transport layer, the session layer, the presentation layer or the application layer. As for the Darpa reference model, the layers except the data-link layer include the physical layer, the network layer, the transport layer or the application layer. The network management protocol is, for example, the simple network management protocol (SNMP) or TR-069 applied to the application layer. In this illustrated embodiment, the network management protocol is TR-069.

TR-069 is the network management protocol established by the digital subscriber loop forum (DSL Forum), and generally includes setting, reading, adding, deleting, downloading and resetting functions or services. The setting function is to write at least one predefined value into the user apparatus 21 by the network managing agent apparatus 22. After the writing is completed, the user apparatus 21 transmits an acknowledgement packet to the network managing agent apparatus 22. The reading function is to transmit a reading request to the user apparatus 21 by the network managing agent apparatus 22, and the user apparatus 21 transmits the acknowledgement packet to the network managing agent apparatus 22. The acknowledgement packet includes the data to be read by the network managing agent apparatus 22. The adding function is to request, by the network managing agent apparatus 22, the user apparatus 21 to add a new object, such as a file folder, so that the network managing agent apparatus 22 can read the data in this object, or write the data into the object. The deleting function is to request, by the network managing agent apparatus 22, the user apparatus 21 to delete an object. The download function is to download a firmware program, a configuration file or other information from the network managing agent apparatus 22 to the user apparatus 21. A plurality of managing packets (MP) is required to finish this function. Of course, during the downloading processing, the user apparatus 21 also continues transmitting the acknowledgement packet to the network managing agent apparatus 22. The resetting function is to request, by the network managing agent apparatus 22, to reset the modem 211 of the user apparatus 21.

Figure 5:
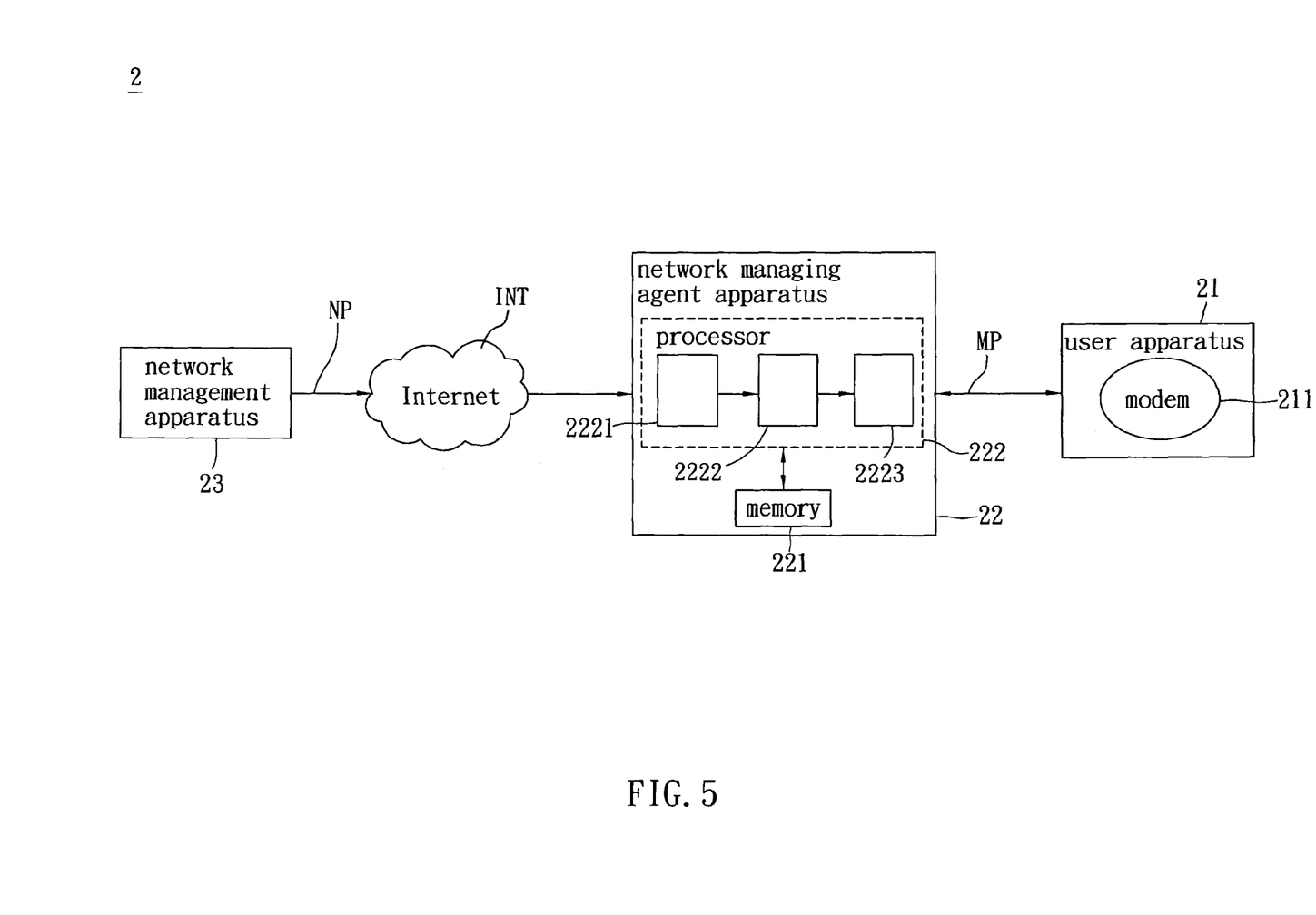
FIG. 5 is a schematic illustration showing a network management system according to another embodiment of the invention.

As shown in FIG. 5, the network managing agent apparatus 22 transmits the managing packet (MP) to the user apparatus 21 to perform the management, and the managing packet (MP) carries at least one information string, which includes the instructions or data of the functions of TR-069. The instructions or data may be stored in a memory 221 of the network managing agent apparatus 22 in advance. In addition, information (e.g., the MAC address of the user apparatus 21) obtained by the network managing agent apparatus 22 from the user apparatus 21 may also be recorded in the memory 221.

The network managing agent apparatus 22 can perform the network management on the user apparatus 21 by itself, and may also perform the network management according to the information transmitted from the network management apparatus 23. That is, the information string of the managing packet (MP) may be provided by the network management apparatus 23. For example, the network management apparatus 23 transmits an IP packet including the information string, and the IP packet is transmitted to the network managing agent apparatus 22 through the Internet INT. The network managing agent apparatus 22 has a processor 222 including a receiving module 2221, a converting module 2222 and a transmitting module 2223. The receiving module 2221 receives the IP packet (NP). The converting module 2222 is electrically connected to the receiving module 2221 and packs the information string in the IP packet (NP) into the managing packet (MP) according to the Ethernet protocol. The information string may be placed in the data field (MP2) (see FIG. 4) of the managing packet (MP). The transmitting module 2223 is electrically connected to the converting module 2222 and transmits the managing packet (MP) to the user apparatus 21 so that the network management of the network management apparatus 23 for the user apparatus 21 may be finished.

Figure 6:
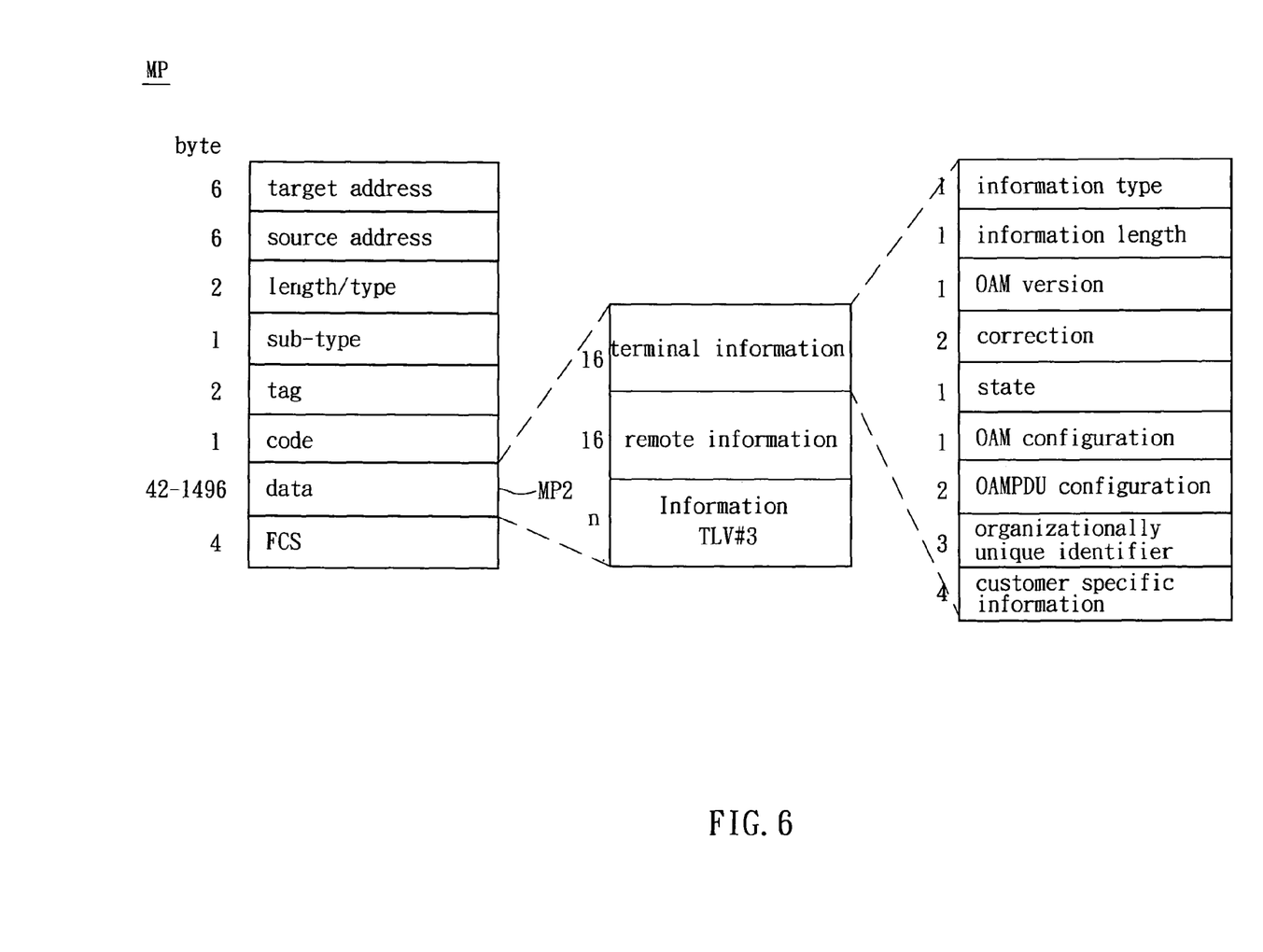
FIG. 6 is a schematic illustration showing an OAMPDU packet transmitted by the network management system according to the embodiment of the invention.

In addition, the network management protocol supported by the modem 211 of the user apparatus 21 is unnecessary to be TR-069, and may be any other network management protocol (e.g., the simple network management protocol). So, the network managing agent apparatus 22 has to know the protocol supported by the user apparatus 21 in advance in order to perform the network management for the user apparatus. In other words, the user apparatus 21 and the network managing agent apparatus 22 must have the same ability of supporting the same protocol so that the communication may be performed. In this embodiment, the network managing agent apparatus 22 obtains the information according to a discovery process defined in the IEEE 802.3ah protocol. Referring to FIG. 6, the data field MP2 of the managing packet (MP) has terminal information including customer specific information. When the network managing agent apparatus 22 transmits the managing packet (MP) to the user apparatus 21, the user apparatus 21 transmits the acknowledgement packet to the network managing agent apparatus 22, and records the information relating to the supported function or protocol in the customer specific information field. Consequently, the network managing agent apparatus 22 can know the supported protocol of the user apparatus 21, and this information may also be stored in the memory 221. In this embodiment, the acknowledgement packet may be an OAMPDU packet.

Figure 7:
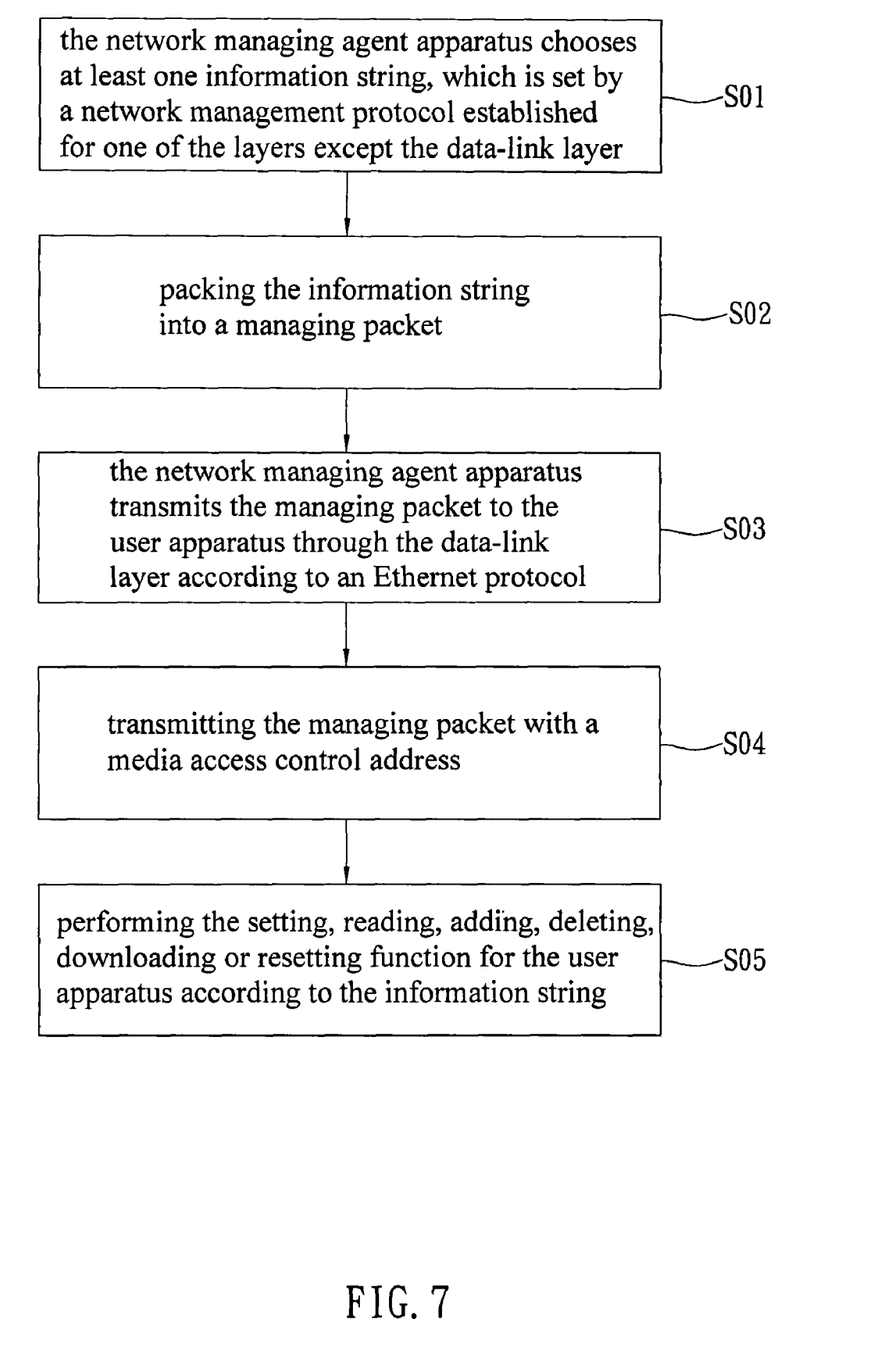
FIG. 7 is a flow chart showing a network management method according to the preferred embodiment of the invention.

Referring to FIG. 7, the network management method according to the preferred embodiment of the invention is applied to the network management system 2, and includes the following steps. In step S01, the network managing agent apparatus 22 adopts at least one information string, which is set by a network management protocol established for one of the layers except the data-link layer. In step S02, the information string is packed into a managing packet (MP). In step S03, the network managing agent apparatus 22 transmits the managing packet (MP) to the user apparatus 21 through the data-link layer according to an Ethernet protocol. In step S04, the managing packet (MP) is transmitted with a media access control address. In step S05, the setting, reading, adding, deleting, downloading or resetting function is performed for the user apparatus 21 according to the information string.

In addition, the network management method further includes the step of transmitting an IP packet (NP), comprising an information string, to the network managing agent apparatus 22 through the network by the network management apparatus 23.

In addition, when the Ethernet protocol is IEEE 802.3ah, the network management method further includes the steps of: transmitting an OAMPDU packet to perform a discovery process; transmitting hardware information to the network managing agent apparatus 22 through an acknowledgement packet by the user apparatus 21; and storing the hardware information or the information string in the memory 221 of the network managing agent apparatus 22.

Because the network management method of this embodiment has been described in the network management system 2, detailed descriptions thereof will be omitted.

In summary, the network management method according to the invention has the following features. A network managing agent apparatus serves as the network management apparatus, such as the network management server of the ISP, and the network management agent of the user apparatus. The Ethernet is established between the network managing agent apparatus and the user apparatus. Then, the network apparatus (e.g., modem) of the user apparatus is managed according to the instruction or data set by the network management protocol (e.g., SNMP and TR-069) established for one of the layers except the data-link layer.

Compared with the prior art, the invention distributes the loading of the network management apparatus for all the user apparatuses over the network managing agent apparatuses, and establishes the distributed management architecture so that the workload of the network management apparatus is decreased, and the processing efficiency of the network management apparatus is enhanced. In addition, each network managing agent apparatus directly transmits the managing packet to the user apparatus without through the Internet, so the usage efficiency of the bandwidth is increased. Furthermore, since the Ethernet is established between the network managing agent apparatuses and the user apparatus, the network transmission speed and the network managing efficiency may be greatly increased.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A network management method applied to a network management system, the network management system including at least one user apparatus and a network managing agent apparatus connected to the user apparatus, the management method comprising steps of:
    transmitting an IP packet, comprising at least one information string, to the network managing agent apparatus through a network by a network management apparatus;
    receiving the IP packet by the network managing agent apparatus;
    adopting the at least one information string, which is set by a network management protocol established for at least one layer except a data-link layer, by the network managing agent apparatus;
    packing the at least one information string into a managing packet; and
    transmitting the managing packet to the user apparatus through the data-link layer according to an Ethernet protocol by the network managing agent apparatus;
    wherein the network management protocol is TR-069 or a simple network management protocol (SNMP).

2. The method according to claim 1, further comprising:
    transmitting the managing packet with a media access control address.

3. The method according to claim 1, wherein the Ethernet protocol is IEEE 802.3ah.

4. The method according to claim 3, wherein the managing packet is an operation, administration and maintenance protocol data unit (OAMPDU) packet.

5. The method according to claim 4, further comprising:
    transmitting the OAMPDU packet to perform a discovery process; and
    transmitting hardware information to the network managing agent apparatus through an acknowledgement packet by the user apparatus.

6. The method according to claim 5, further comprising:
    recording the hardware information or the at least one information string in a memory of the network managing agent apparatus.

7. The method according to claim 1, wherein the layer except the data-link layer is a physical layer, a network layer, a transport layer, a session layer, a presentation layer or an application layer in an open system interconnection (OSI) reference model.

8. The method according to claim 1, wherein the layer except the data-link layer is a physical layer, a network/transport layer or an application layer in a Darpa reference model.

9. A network management method applied to a network management system, the network management system including at least one user apparatus and a network managing agent apparatus connected to the user apparatus, the management method comprising steps of:

adopting at least one information string, which is set by a network management protocol established for at least one layer except a data-link layer, by the network managing agent apparatus;

packing the at least one information string into a managing packet;

transmitting the managing packet to the user apparatus through the data-link layer according to an Ethernet protocol by the network managing agent apparatus, wherein the network management protocol is TR-069 or a simple network management protocol (SNMP);

performing an instruction for setting, reading, adding, deleting, downloading or resetting on the user apparatus according to the at least one information string, wherein the Ethernet protocol is IEEE 802.3ah, and the managing packet is an operation, administration and maintenance protocol data unit (OAMPDU) packet, wherein transmitting the managing packet comprises transmitting the OAMPDU packet to perform a discovery process; and transmitting hardware information to the network managing agent apparatus through an acknowledgement packet by the user apparatus.

* * * * *